July 3, 1934.
H. A. KNOX ET AL
1,964,735
SUSPENSION FOR VEHICLES
Filed Oct. 14, 1933
2 Sheets-Sheet 1
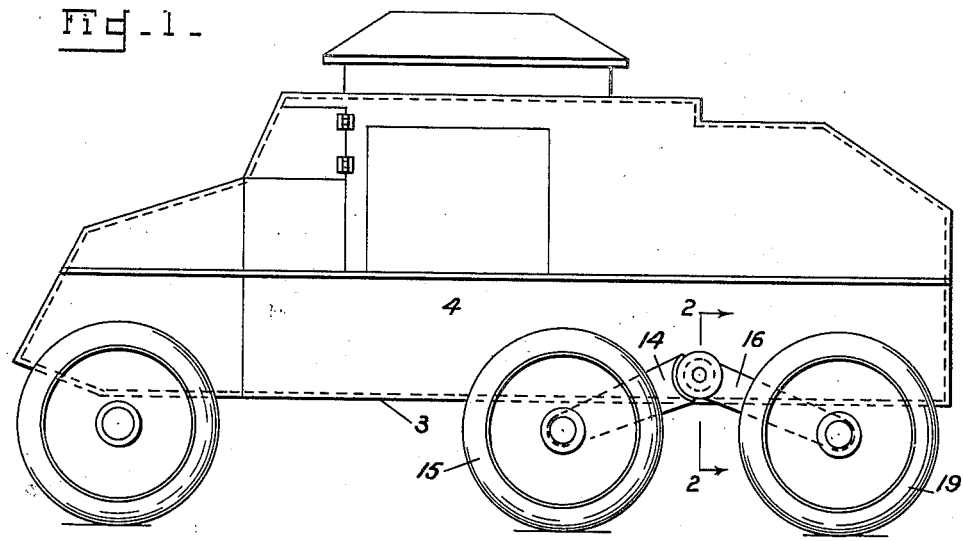
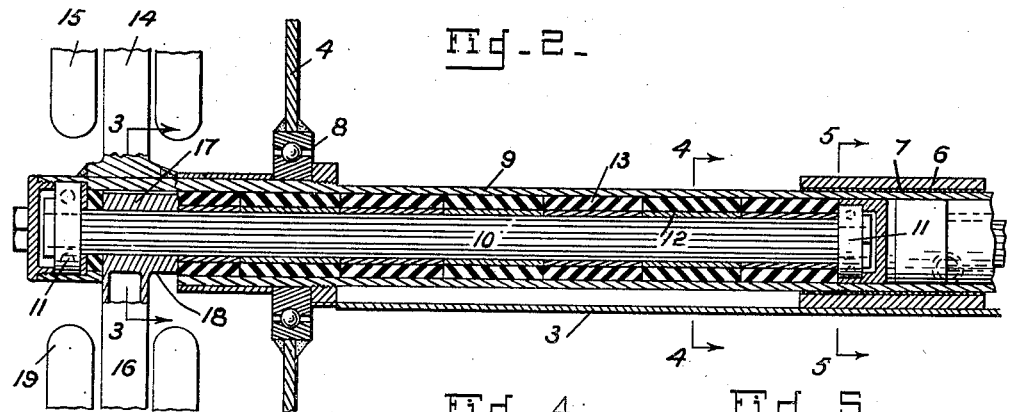
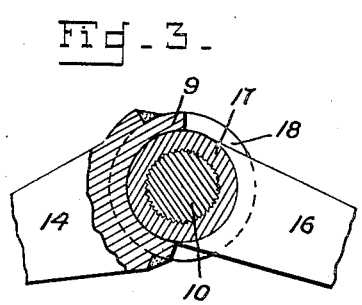
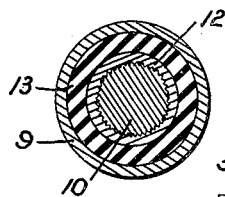
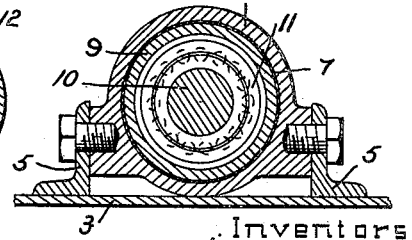
Inventors
Harry A. Knox
Thomas H. Nixon
By W. N. Roach
Attorney

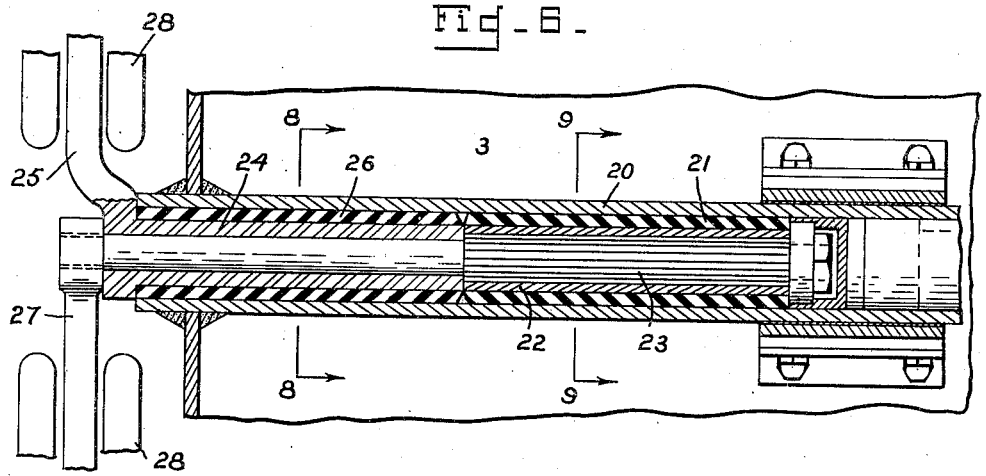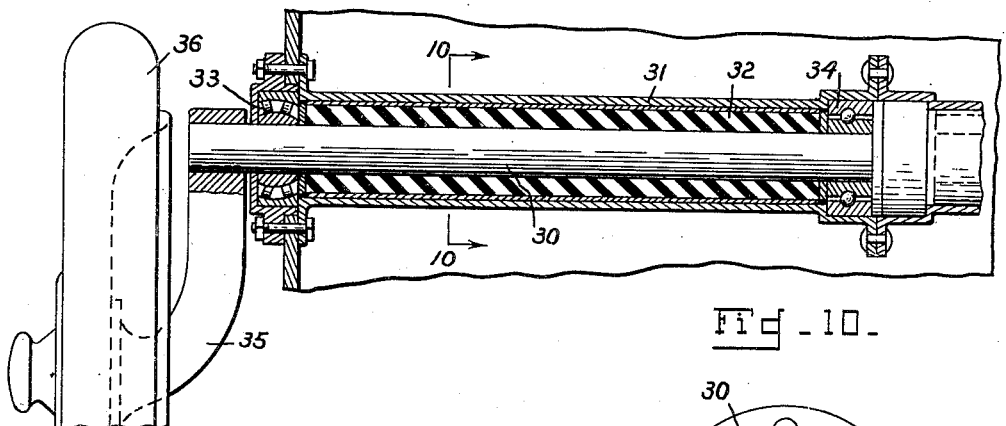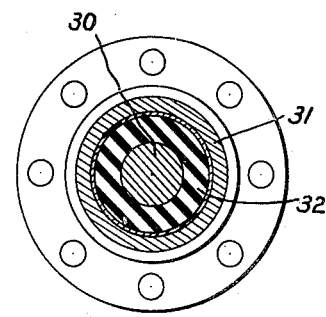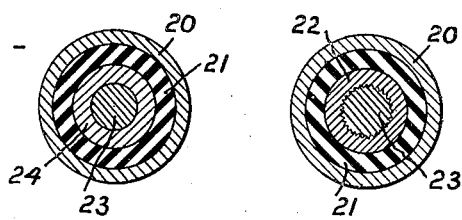

Patented July 3, 1934

1,964,735

UNITED STATES PATENT OFFICE 1,964,735

SUSPENSION FOR VEHICLES

Harry A. Knox, Davenport, Iowa, and Thomas Hay Nixon, Gettysburg, Pa.

Application October 14, 1933, Serial No. 693,686

10 Claims. (Cl. 267—21)

(Granted under the act of March 3, 1883, as amended April 30, 1928; 370 O. G. 757)

The invention described herein may be manufactured and used by or for the Government for governmental purposes, without the payment to us of any royalty thereon.

The subject of this invention is a suspension for vehicles and is intended primarily as a substitute for the usual spring suspension in certain types of vehicle.

The invention generally consists in the use of rubber bushings to absorb road shocks and permit a properly restrained movement of the vehicle body with relation to its running gear.

Specifically the invention consists in providing rubber bushings between shafts which oscillate with respect to each other and which carry wheels of the vehicle; or in providing such bushings between a casing secured to the vehicle and a shaft mounted to oscillate with respect to the casing, and in the provision of means for relieving the rubber bushings of the crushing weight of the vehicle body such means preferably being anti-friction bearings for the shaft.

The invention further consists in the novel arrangement and combination of parts and in the details of construction hereinafter described and claimed it being understood however that changes in the precise embodiments of the invention herein disclosed may be made within the scope of what is claimed without departing from the spirit of the invention.

Practical embodiments of the invention are shown by way of illustration in the accompanying drawings wherein:

Fig. 1 is an end elevation of a preferred form of the device.

Fig. 2 is a section on the line 2—2 of Fig. 1.

Fig. 3 is a section on the line 3—3 of Fig. 2.

Fig. 4 is a section on the line 4—4 of Fig. 2.

Fig. 5 is a section on the line 5—5 of Fig. 2.

Fig. 6 is a longitudinal section of a modified form of the device.

Fig. 7 is a similar view of a still further modification.

Fig. 8 is a section on the line 8—8 of Fig. 6.

Fig. 9 is a section on the line 9—9 of Fig. 6.

Fig. 10 is a section on the line 10—10 of Fig. 7.

Referring to the drawings by numerals of reference:

A vehicle body is indicated consisting in part of the floor 3 and side plates 4. Secured to the floor by bolts or in other suitable manner are brackets 5—5 for mounting an inner bearing 6. The bearing 6 is preferably provided with an oilless bushing 7. Secured in the side plates 4 of the vehicle by welding or other suitable method is the outer ring of the race of a frictionless bearing 8.

Mounted in the bearings 6 and 8 for rotation about its longitudinal axis is a hollow shaft 9. Within the hollow shaft 9 is a shaft 10 which is spaced from and concentric with said shaft 9. The inner shaft 10 may be conveniently supported in anti-friction bearings 11—11, positioned within the hollow shaft adjacent to its outer and inner ends and acting to maintain the concentricity of the shafts under all changes in the vehicle load. The inner shaft 10 is preferably serrated to engage the interior serrations of sleeves 12 which have a free sliding fit on the shaft. The sleeves 12 are encircled by rubber bushings 13, and may abut against one another as shown, or may be spaced apart where there is need for less yielding restraint. The rubber bushing may be vulcanized to the sleeve 12 and press-fitted in the hollow shaft 9.

Secured to the hollow shaft as by welding and adjacent to its outer end is a radially disposed arm 14 at the outer end of which is carried the ground engaging element 15. Keyed to the inner shaft 10 preferably through means of the serrations, is a radially disposed arm 16, the hub 17 of which is housed in the outer hollow shaft entering the same through a slot 18 provided in said shaft. The arm 16 carries at its outer end the ground engaging element 19.

As will be evident from the drawings the parts hereinbefore described are duplicated on the opposite side of the vehicle.

It is quite evident that in the structure just described the arms 14 and 16 may oscillate in unison, the shafts likewise so oscillating in the bearings 6 and 8 causing no flexure whatever in the rubber bushings. It is also apparent that the arms may oscillate with respect to each other causing angular movement of one shaft with respect to the other, producing flexure of the rubber bushing which acts to restore the arms to normal position.

The modified form shown in Fig. 6 consists of a casing 20 suitably secured to the body of the vehicle. Within the casing and situated toward the inner portion thereof is a press-fitted rubber bushing 21 vulcanized to the outer surface of a metal sleeve 22 the inner surface of which is serrated to engage the serrations on the inner end of a shaft 23, the forward or outer portion of said shaft being of reduced diameter. Surrounding the reduced portion of the shaft is the elongated hub 24 of an arm 25. Vulcanized on the hub 24 is a rubber bushing 26 which is press-fitted into the casing 20. An arm 27 is keyed on the protruding outer end of the shaft 23 and each arm 25 and 27 carries a ground engaging element 28—28.

With this structure when the arms 25 and 27 oscillate in unison the rubber bushings are flexed which did not take place with the preferred form.

In the modification illustrated in Fig. 7 only one shaft 30 is shown mounted within a casing 31, secured to the vehicle body. Interposed between the shaft and casing is a rubber bushing 32 which permits limited angular movement of the shaft with respect to the casing due to the flexure of the rubber bushing. To prevent deformation of the rubber bushing due to the weight of the vehicle, a bearing 33, preferably of the self aligning anti-friction type is provided adjacent the forward outer end of the shaft 30 and if desired, a bearing 34 may be provided to support the inner end of the shaft 30. An arm 35 is secured on the outer end of the shaft 30 and carries at its free end a ground engaging element 36.

We claim.

1. A vehicle suspension embodying telescoped shafts, ground engaging elements carried by adjacent ends of the shafts, and rubber bushings engaging said shafts to limit the angular displacement thereof.

2. A vehicle suspension embodying a hollow shaft, a shaft within the hollow shaft, a rubber bushing interposed between the shafts and means carried by each shaft for mounting a ground engaging element thereon.

3. A vehicle suspension embodying a hollow shaft, a shaft within the hollow shaft, a rubber bushing keyed to the inner shaft and engaging the outer shaft, said bushing being under compression, and means carried by each shaft for mounting a ground engaging element.

4. A vehicle suspension embodying a hollow shaft, a shaft passing through the hollow shaft, a rubber bushing engaging each shaft to limit the angular movement thereof, and means carried by each shaft for mounting a ground engaging element.

5. A vehicle suspension embodying a hollow shaft, a shaft within the hollow shaft, a rubber bushing between the shafts, said bushing being under compression, and a crank arm carried by each shaft for mounting a ground engaging element.

6. A vehicle suspension embodying a hollow shaft, a shaft within the hollow shaft, a metallic sleeve keyed to said inner shaft, a rubber bushing vulcanized to the sleeve and press-fitted within the hollow shaft and means carried by each shaft for mounting a ground engaging element.

7. A vehicle suspension embodying concentric shafts, crank arms carried by the shafts, said crank arms angularly disposed with respect to each other, means carried by each crank arm for mounting a ground engaging element and rubber bushings engaging the shafts to limit the angular displacement thereof.

8. A vehicle suspension embodying telescoped shafts, a crank arm carried by each shaft, said arms angularly disposed with respect to each other, means carried by each crank arm for mounting a ground engaging element, and rubber bushings engaging the shafts to limit the angular displacement thereof.

9. A vehicle suspension embodying a hollow shaft, a shaft within the hollow shaft, a crank arm carried by each shaft, said arms being angularly disposed with respect to each other, means on each arm for mounting a ground engaging element and a rubber bushing interposed between the shafts.

10. A vehicle suspension embodying, a casing; a shaft within the casing and mounted to oscillate with respect thereto, the outer portion of the shaft of reduced diameter; a hollow shaft surrounding the reduced portion of the first shaft and providing a journal therefor, a separate rubber bushing between each shaft and the casing to restrain the oscillations thereof and restore them to normal positions, and ground engaging elements carried by each shaft.

HARRY A. KNOX.
THOMAS HAY NIXON.